April 23, 1968     G. OBATA     3,378,963
SCIENCE BUILDING LAYOUT AND EQUIPMENT
Filed July 30, 1964     6 Sheets-Sheet 1

Gyo Obata,
Inventor.
Koenig, Senniger,
Powers and Leavitt,
Attorneys.

April 23, 1968 G. OBATA 3,378,963

SCIENCE BUILDING LAYOUT AND EQUIPMENT

Filed July 30, 1964 6 Sheets-Sheet 2

April 23, 1968   G. OBATA   3,378,963
SCIENCE BUILDING LAYOUT AND EQUIPMENT
Filed July 30, 1964   6 Sheets-Sheet 3

April 23, 1968     G. OBATA     3,378,963
SCIENCE BUILDING LAYOUT AND EQUIPMENT
Filed July 30, 1964     6 Sheets-Sheet 5

April 23, 1968 G. OBATA 3,378,963
SCIENCE BUILDING LAYOUT AND EQUIPMENT
Filed July 30, 1964 6 Sheets-Sheet 6

United States Patent Office 3,378,963
Patented Apr. 23, 1968

3,378,963
SCIENCE BUILDING LAYOUT AND
EQUIPMENT
Gyo Obata, Ladue, Mo., assignor to Southern Illinois
University Foundation, Carbondale, Ill., a corporation
of Illinois
Filed July 30, 1964, Ser. No. 386,257
7 Claims. (Cl. 52—34)

This invention relates to science facilities, and more particularly to a high student utilization science labaratory facility.

The invention is particularly concerned with a coordinated system of science building layout and equipment used in laboratory rooms in the building for accommodation of the various disciplines of science curricula (e.g., chemistry, biology, physics) providing for maximum student utilization of facilities and flexibilty of utilization of laboratory space and equipment to take care of changing requirements. In this regard, it will be understood that educational programs and student loads in the science disciplines are subject to change, and a need for expansion or contraction of facilities for individual disciplines may arise relatively frequently, even from one semester to the next. Thus, while at one time there may be considerable demand for laboratory facilities for one discipline (e.g., organic chemistry) and low demand for laboratory facilities for another (e.g., microbiology), at another time there may be a low demand as to the former and a considerable demand for the latter.

Accordingly, among the several objects of the invention may be noted the provision of a system such as described which, with relative economy, enables accommodation of a wide variety of disciplines such as may be established for the science curricula by the faculty administration, and which further enables changes in the setup of various laboratories from one discipline to another with a minimum of physical alteration; the provision of a system such as described which, as to a given laboratory, enables maximum student utilization of the laboratory facilities, for example, occupation by as many as ten to twelve four-hour classes per week, with twenty-four students per class; and the provision of equipment for such a system which, when necessary, can be readily changed for usage for different disciplines in a minimum of time and with a maximum of reused equipment components. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated.

Corresponding reference characters indicate corresponding parts throughout the several views of the drawings.

Figure 1:
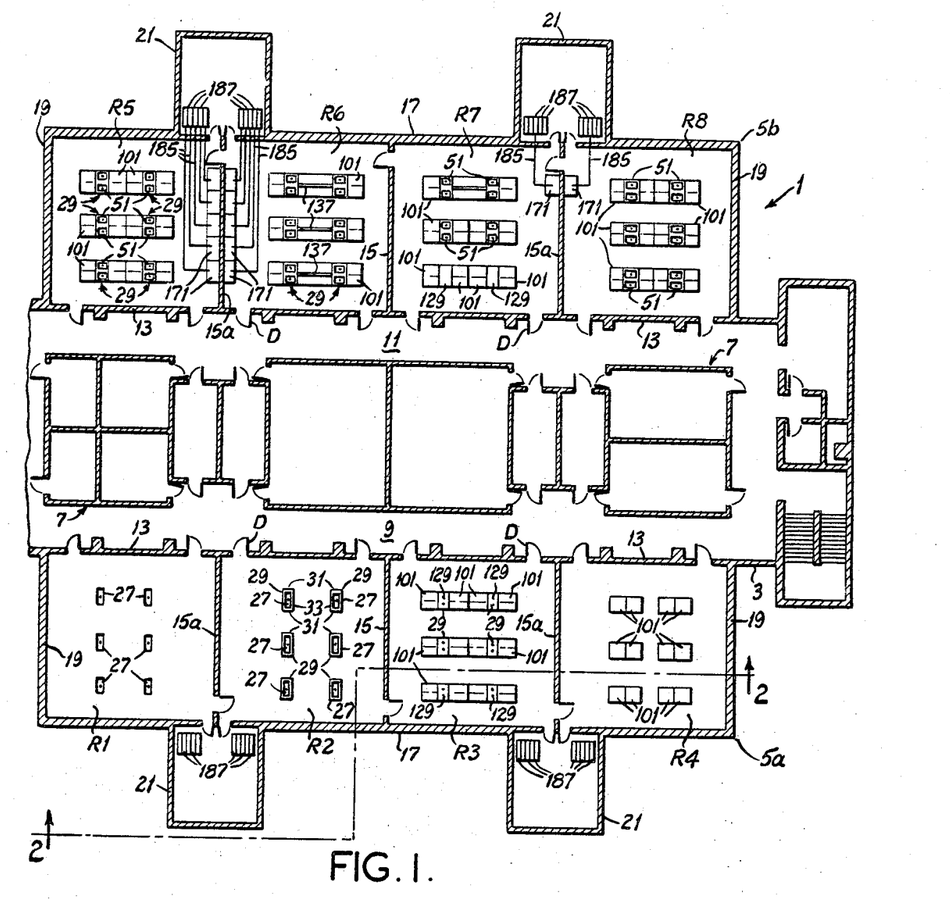
FIG. 1 is a floor plan of part of a wing of a science building also showing the arrangement of equipment therein in accordance with this invention.
Figure 2:
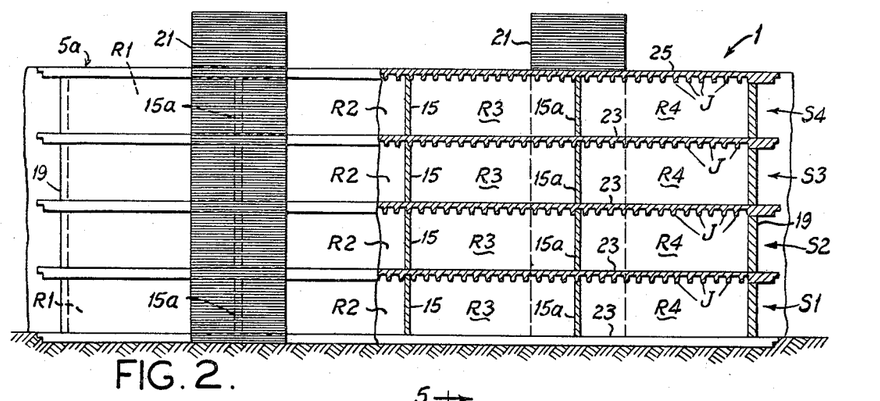
FIG. 2 is a view of the building wing partly in side elevation and partly in vertical section on line 2—2 of FIG. 1.

Referring first to FIGS. 1 and 2 of the drawings, there is generally indicated at 1 a laboratory and classroom wing of a science building having laboratory facilities in accordance with this invention. As shown, this wing of the building has four stories designated S1–S4 in FIG. 2 (it being understood that the number of stories is not in any way critical). It may be regarded as having a central section 3 flanked by outside sections 5a and 5b which are somewhat shorter than the central section. In each story, the central section is partitioned as generally indicated at 7 in FIG. 1 to provide interior rooms for various purposes, such as classrooms, a balance room, an instrument room, an autoclave room, etc. This interior room arrangement is not critical so far as this invention is concerned. Corridors 9 and 11 extend the length of the central section at its sides. Each outside section 5a and 5b is partitioned to provide, in each of these sections, a series of outside rooms generally designated by the letter R. This partitioning comprises partitions 13 extending lengthwise of the wing 1 of the building and partitions 15 and 15a extending between partitions 13 and the outside walls 17 of the outside sections. The end walls of the outside sections are indicated at 19. Doors are indicated generally at D.

As shown, there are four rooms R in each of the two outside sections 5a and 5b. The four rooms in section 5a are specially designated R1, R2, R3 and R4, and the four rooms in section 5b are specially designated R5, R6, R7 and R8. These rooms are preferably square in plan, and may measure thirty-five feet by thirty-five feet, for example. The partitions denoted 15a are common to adjacent pairs of rooms R1 and R2, R3 and R4, R5 and R6, R7 and R8, respectively. On the outside wall 17 of each outside section, there are two utility towers, each designated 21, these being located in the vertical planes of the common partitions 15a.

Partitions 15 and 15a and end walls 19 of the outside sections are regarded as constituting side walls for the several rooms R. Partitions 13 and outside walls 17 of the outside sections are regarded as constituting end walls for the rooms, partition 13 constituting the inside end wall of each room and wall 17 constituting the outside end wall of each room. As shown in FIG. 2, the floors 23 and roof 25 of the structure may be of poured concrete long span joist construction, the joists J extending between the outside walls 17, for elimination of interior columns and bearing walls and permitting freedom of interior partition locations.

Rooms R1–R8 are especially adapted to serve as laboratory rooms for various science disciplines (although, of course, adapted to serve for other purposes). For purposes of illustration, in FIG. 1 room R1 is shown as vacant, in order to show the location of certain utility openings 27 which are provided in the floor of each of rooms R1–R8. Room R2 is shown in a partially furnished stage with certain cabinets 29 positioned on the floor over the utility openings 27. These cabinets serve as the basis for set up of different rooms to accommodate various scientific disciplines. For purposes of illustration, rooms R3–R8 are shown as set up as laboratory rooms for Advanced Physics, General Physics, Analytical Chemistry, Organic Chemistry, Physical Chemistry and Microbiology, respectively. The setup in each instance generally involves the use of certain table facilities in conjunction with the cabinets in a manner to be described. In the case of the Organic and Physical Chemistry laboratories, the setup also involves the use of a so-called distillation or vacuum rack to be described. The setup of any room may be readily changed to convert it from usage as a laboratory for one discipline to usage as a laboratory for another discipline, as will appear.

Referring to the plan of room R1 in FIG. 1, it will be observed that there are two parallel rows of utility openings 27 in the floor 23, three openings in each row being shown. These rows extend endwise of the room (i.e., laterally of the section 5a in which the room is located), each row being located between a pair of joists J. The rows are spaced inward from the side walls of the room, the end openings of each row are spaced inward from the end walls of the room, and the openings in each row are spaced from one another lengthwise of each row. Each opening in one row is transversely aligned and paired with a respective opening of the other row sidewise of the room. It will be understood that each of rooms R2–R8 has an arrangement of floor openings 27 similar to that of room R1.

Referring to the plan of room R2 in FIG. 1, it will be observed that a cabinet 29 is positioned on the floor of the room over each of the openings 27, and it will be understood that cabinets 29 are positioned on the floor of each of rooms R3–R8 over each of the floor openings 27 therein. Cabinet 29 (see particularly FIGS. 3–6) is of special construction in accordance with this invention. Generally, it is rectangular in plan, its ends being designated 31 and its sides being designated 33. Each cabinet is positioned extending in the direction of joists J with its ends 31 parallel to the end walls 13 and 17 of the respective room, and its sides 33 parallel to the side walls 15 and 15a or 19 of the respective room. As shown, the sides 33 of the cabinet are constituted by rectangular panels of plywood (or other suitable material). At each end of the cabinet there is an upper end panel 35 extending between and suitably secured to the side panels. Immediately below this is another end panel 37 extending between and removably secured to the side panels. Below panel 37 at each end of the cabinet is a pair of hinged doors 39 for access to an enclosure defined by a back panel 41 and a bottom panel 43 extending between side panels 33 of the cabinet. A shelf 45 may be provided in this enclosure, if desired. The back panels 41 of the cabinet structure and the back edges of bottom panels 43 are widely spaced so that the cabinet is interiorly open as indicated at 47 in FIG. 5 for passage of utility lines. Bottom panels 43 are spaced above the bottom edges of side panels 33 and have transverse supports 49 secured to the bottom thereof carrying leveling screws 50 which engage the floor. Supports 49 are set in from the ends of the cabinet.

The back panels 41 terminate short of the top of the cabinet, which is wholly open above the tops of panels 41. Thus, above the tops of panels 41, there is a rectangular space bounded by side panels 33 and end panels 35 of the cabinet which is adapted for the reception of two sinks each designated 51 dropped in through the top of the cabinet. Each sink is rectangular in plan, having a bottom 53, front and back walls 55 and 57, and end walls 59. The endwise dimension of each sink (measured from one end wall 59 to the other end wall of the sink) is somewhat less than the interior width of the cabinet, and the front-to-back dimension of the sink, as shown, is less than its endwise dimension. The sinks bear on leveling screws such as indicated at 61 threaded in tapped holes in the horizontal legs of angle iron rails 63 secured to the inside of the side panels 33 of the cabinet, these rails extending horizontally along the inside of panels 33 just above the top of the back panels 41. The elevation of these sink-supporting rails is such and screws 61 are generally so adjusted that the top of each sink projects somewhat above the top of the cabinet. The sinks are set in the cabinet one toward one end and the other toward the other end of the cabinet with a space 65 (see FIGS. 4 and 5) between their back walls 57 for passage of utility lines.

Figure 3:
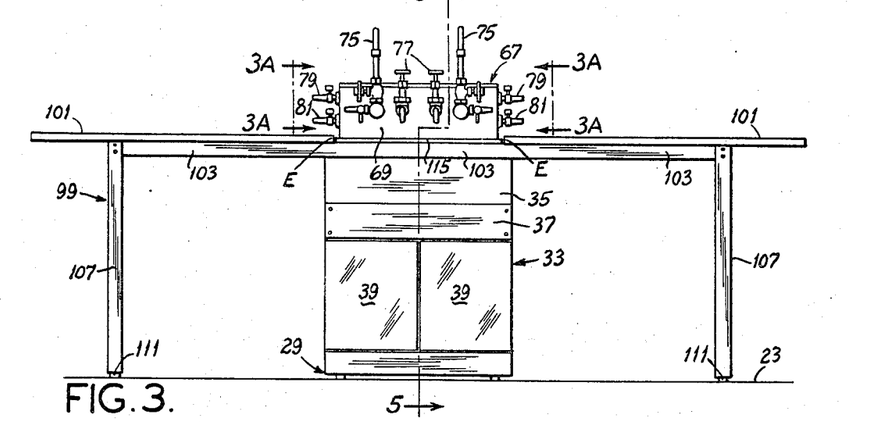
FIG. 3 is a view in elevation of a cabinet-table-utility box assembly of the invention.
Figure 5:
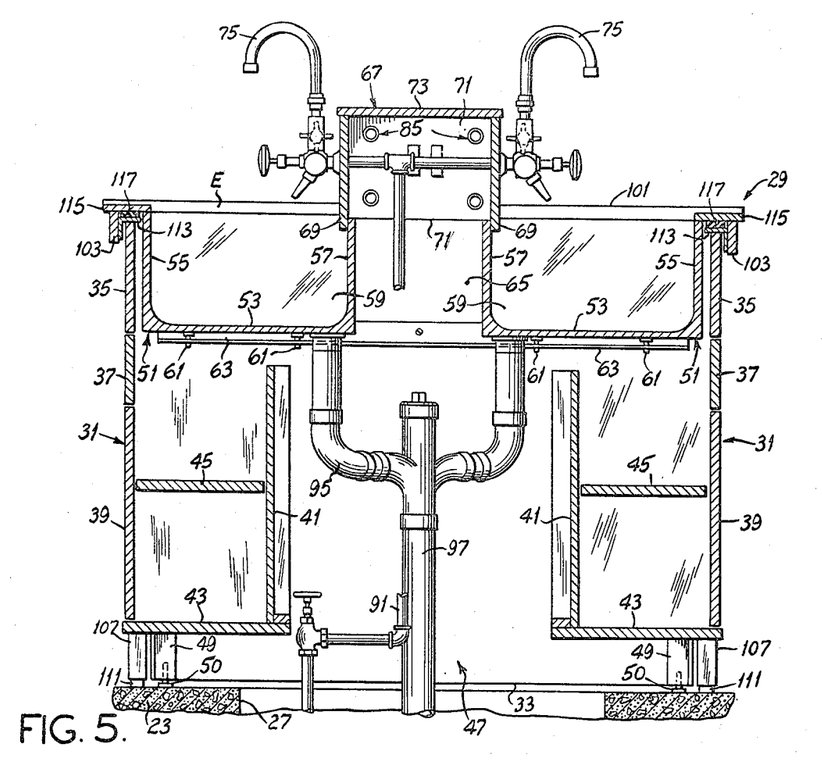
FIG. 5 is an enlarged vertical section taken on line 5—5 of FIG. 3.
Figure 6:
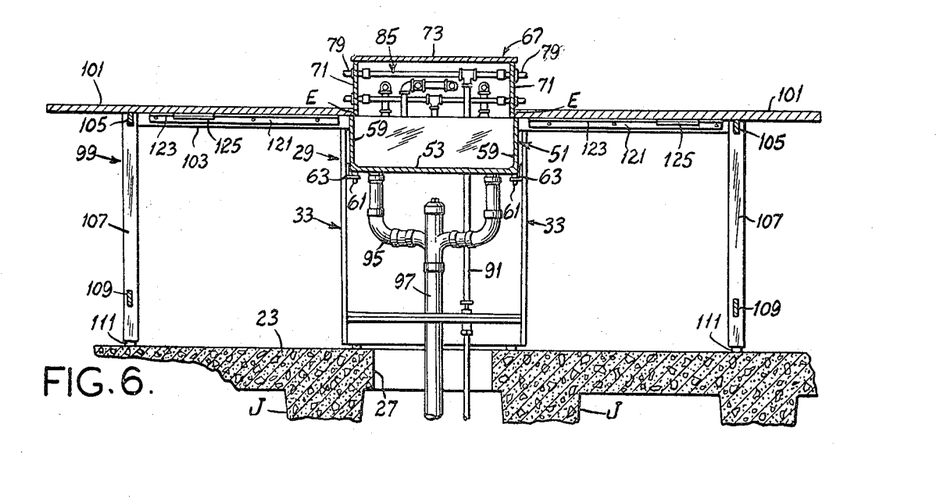
FIG. 6 is a vertical section taken on line 6—6 of FIG. 4.

As shown in FIGS. 3, 5 and 6, a box 67 is removably mounted on the back walls of the two sinks. This box, which constitutes a utility box common to the two sinks, has face panels 69, end panels 71, and a top panel 73, being open at the bottom. The width of the face panels is slightly less than the internal endwise dimension of the sinks. The face panels extend downward somewhat below the bottom edges of the end panels 71. The bottom edges of end panels 71 bear on the upper edges of the back walls of the sinks, and the lower portions of the face panels extend down in front of the back walls 57 of the sinks, these walls 57 being spaced a distance corresponding to the width of the end panels 71 of the box (see FIG. 5).

Figure 3A:
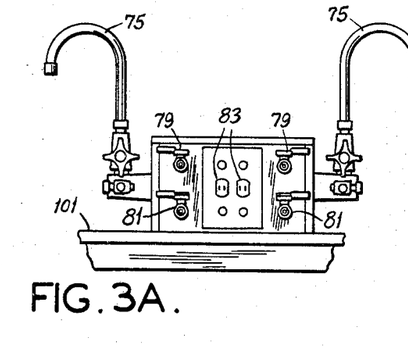
FIG. 3A is a view taken on either of lines 3A—3A of FIG. 3.

Each face panel 71 of the utility box carries a group of utility outlets for utilization by a student working at the respective sink. As shown in FIG. 3, each face panel carries two water outlets 75 and two steam outlets 77, for example. Each end panel of the utility box carries a further array of utility outlets. As shown in FIGS. 3 and 3A, each end panel carries gas outlets 79, compressed air outlets 81, and electrical outlets 83. Utility lines for all these utility outlets of any given cabinet are brought up through the respective floor opening 27 (over which the cabinet is located), through the space 47 provided in the cabinet for passage of utility lines, and up through the open bottom of the utility box 67 to the requisite distribution lines such as generally indicated at 85 in the utility box. A typical utility line riser (a gas riser) coming up through the floor opening is indicated at 91 in FIGS. 5 and 6, as being typical of the utility line arrangement, the risers for other utilities such as water, air and steam not being shown to avoid unnecessary detail, but being similar. Wiring for the electrical outlets is also brought up through the floor opening and the space 47 in the cabinet. Each sink has a drain 93 (see FIG. 4) with a diagonally-arranged Y-connection 95 to a drain pipe 97 extending down the floor opening 27.

As shown in FIGS. 3–6, a table top supporting frame 99 carrying two separate table tops 101 is associated with the cabinet 29. This frame 99 comprises an open rectangular top section having side rails 103 and end rails 105 with legs 107 at the corners thereof. The legs are braced at the ends of the frame as indicated at 109. They have levelers 111 at their lower ends. The side rails are quite long in relation to the width of the cabinet 29 and the length of the end rails 105, and the spacing of the two side rails 103 is somewhat greater than the endwise dimension of cabinet 29 (see particularly FIG. 5).

The frame 99 is placed on the floor with the top of the cabinet 29 centered in the open rectangular top section of the frame, with the long side rails 103 extending horizontally on the outside of the upper end panels 35 of the cabinet and closely adjacent thereto. The height of the frame is such that rails 103 extend somewhat above the top of panels 35. By adjustment of the leveling screws 61, the sinks are positioned with their tops just slightly below the level of the top edges of rails 103. The latter have lugs 113 generally centrally of their length bearing on the top edges of cabinet panels 35 for central support.

Each table top 101, as shown, comprises a square slab. As appears in FIGS. 3, 4 and 6, each table top 101 is mounted on frame 99 on a respective side of cabinet 29, with the inner edge E of the table top contiguous to the end walls of the utility box. Thus, the two table tops extend outward from the tops of the side panels of the cabinet. Trim strips 115 having resilient key strips 117 on the bottom are positioned in the gaps between the edges E of the two table tops overlying the exposed top edges of rails 103, cabinet panels 35 and the front walls 55 of the sinks.

Figure 4:
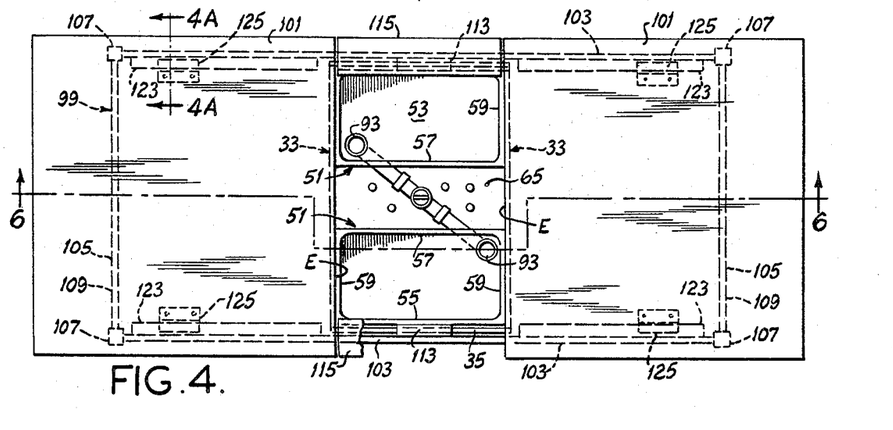
FIG. 4 is a plan of FIG. 3 with the utility box removed and with parts broken away.
Figure 4A:
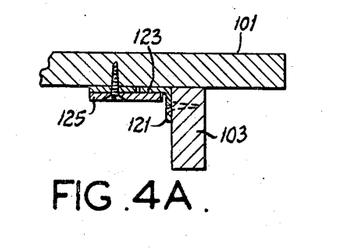
FIG. 4A is an enlarged section taken on line 4A—4A of FIG. 4.
Figure 7:
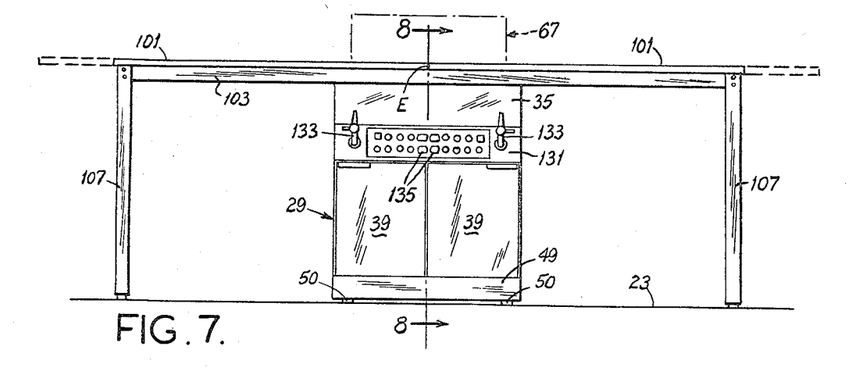
FIG. 7 is an elevation corresponding to FIG. 3 with the utility box removed and certain table tops pushed together, and showing a different utility panel than in FIG. 3.

In the construction of the science building wing 1, utility lines for all desired utilities (water, gas, steam, compressed air, electricity) and a drain pipe 97 are originally installed for each of the utility openings 27 in each of the rooms R1–R8. As will be readily understood, these lines, which are permanent, may be brought in between the floor joists, with terminals either extending upward through the floor openings 27 or accessible through the floor openings. Drain pipe 97, for example, rises up through the floor opening. Connections may then be made in suitable manner from these terminals for the permanent utility lines to the distributor lines in the utility box 67. In the case of usage of a cabinet 29 and the associated table structure in a laboratory room for a science discipline (such as General Physics, for example) where the sinks are not needed, box 67 may be disconnected from the terminals and removed. It is also desirable under these circumstances to remove the Y-connection 95 and cap the drain pipe as indicated at 119 in FIG. 8. Table tops 101 are at least as wide as the cabinet sides 33 and are adapted to be repositioned by sliding them on and parallel to the rails 103 over the top of the cabinet 29 and the sinks 51 to the point where the inner end edges E of the table tops are contiguous in the vertical endwise central plane of the cabinet (see FIG. 7). As best illustrated in FIG. 4A, each side rail 103 has an angle member 121 attached to the inside thereof on each side of the cabinet, with a horizontal leg 123 of the angle member uppermost and flush with the top of the rail 103. The table top bears on these legs of the angle members and on the top of rails 103. The table top has keepers 125 secured thereto which extend under the legs 123 of the angle members to keep the table top from being tilted up or skewed horizontally relative to the rails 103, while permitting sliding of the table top lengthwise of the rails 103.

Figure 1A:
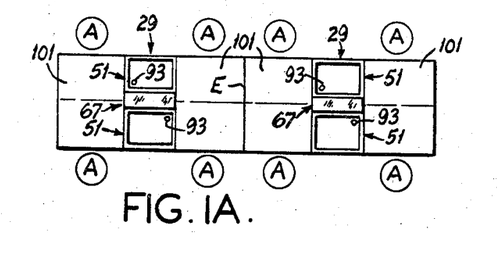
FIG. 1A is an enlarged fragment of FIG. 1.

Referring back to FIG. 1, it will be observed that in room R5, set up as an Analytical Chemistry laboratory room, each of the six cabinets 29 in the room has associated therewith a table-top supporting frame 99 such as shown in FIG. 3, with the two table tops 101 associated with each frame slid outward to its outer position of FIG. 3 for exposure of the two sinks 51 in each cabinet, and with a utility box 67 on each pair of sinks. This takes care of the reqirements for twenty-four students, two students sharing each of the twelve sinks, each student having half of the table top 101 on one side of the sink he shares with another student for use as a workbench. The phantom lines on the table tops in room R5 show the division of these table tops into workbench areas for the twenty-four students. FIG. 1A is an enlargement of the lower group of cabinets and table tops shown in FIG. 1 for room R5, and the stations for the eight students paired in groups of two sharing the respective four sinks are indicated at A. Referring to FIGS. 3 and 3A, it will be observed that each face panel 69 and each end panel 71 of each utility box 67 has a dual set of utility outlets for supplying the four students working around each of the utility boxes. The room, cabinets and table structures are so dimensioned that there is ample work space on the table top for each student, ample space between the table structures, and ample aisle space all around the table structures. As to each group of cabinets and table tops, the two inner table tops in effect form a continuous table spanning the space between the two cabinets in the group.

In room R3, shown in FIG. 1 as set up for an Advanced Physics laboratory, each of the six cabinets at 29 in the room has a table-top supporting frame 99 associated therewith and table tops 101 on the frame positioned the same as in room R5. However, in this instance, the sinks in the cabinets are not needed. They may either be omitted, or, if already installed in the cabinets, covered by an insert such as indicated at 129 flush with the table tops. Generally, gas and electrical outlets are needed for each student, and this requirement is taken care of by replacing panels 37 of the cabinets with utility panels such as shown at 131 in FIG. 7 having gas outlets 133 and electrical outlets 135.

In the room R4, shown in FIG. 1 as set up for a General Physics laboratory, again each of the six cabinets at 29 in the room has a table-top supporting frame 99 associated therewith and table tops 101 on the frame. In this instance, the sinks are not needed, and less table top space is needed than in the Advanced Physics laboratory, and covering of the sinks is taken care of by sliding the table tops 101 inward from their FIG. 7 dotted-line position to their FIG. 7 solid-line position. Also, as in the Advanced Physics laboratory, panels 131 with gas and electrical outlets 133 and 135 are used. A utility box 67 is shown in phantom in FIG. 7 to indicate its position before removal.

In the room R8, shown in FIG. 1 as set up for a Microbiology laboratory, the table top setup is essentially the same as for the Analytical Chemistry laboratory room R5.

Figures 8, 11, 11A:
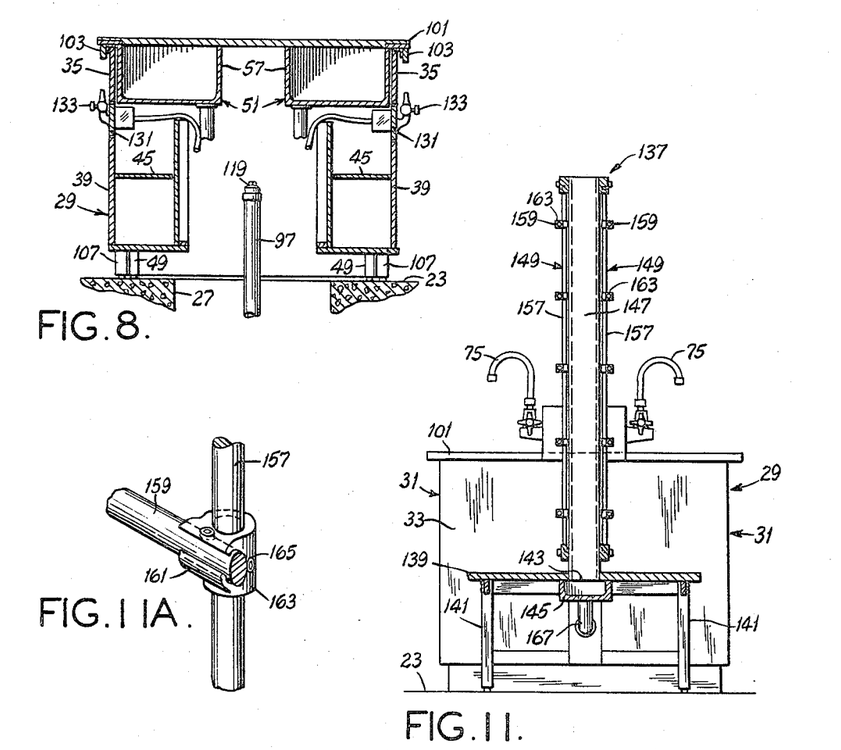
FIG. 8 is a vertical section taken on line 8—8 of FIG. 7.
FIG. 11 is a vertical section taken on line 11—11 of FIG. 10.
FIG. 11A is a fragmentary view showing a detail of the rack.
Figures 9, 10:
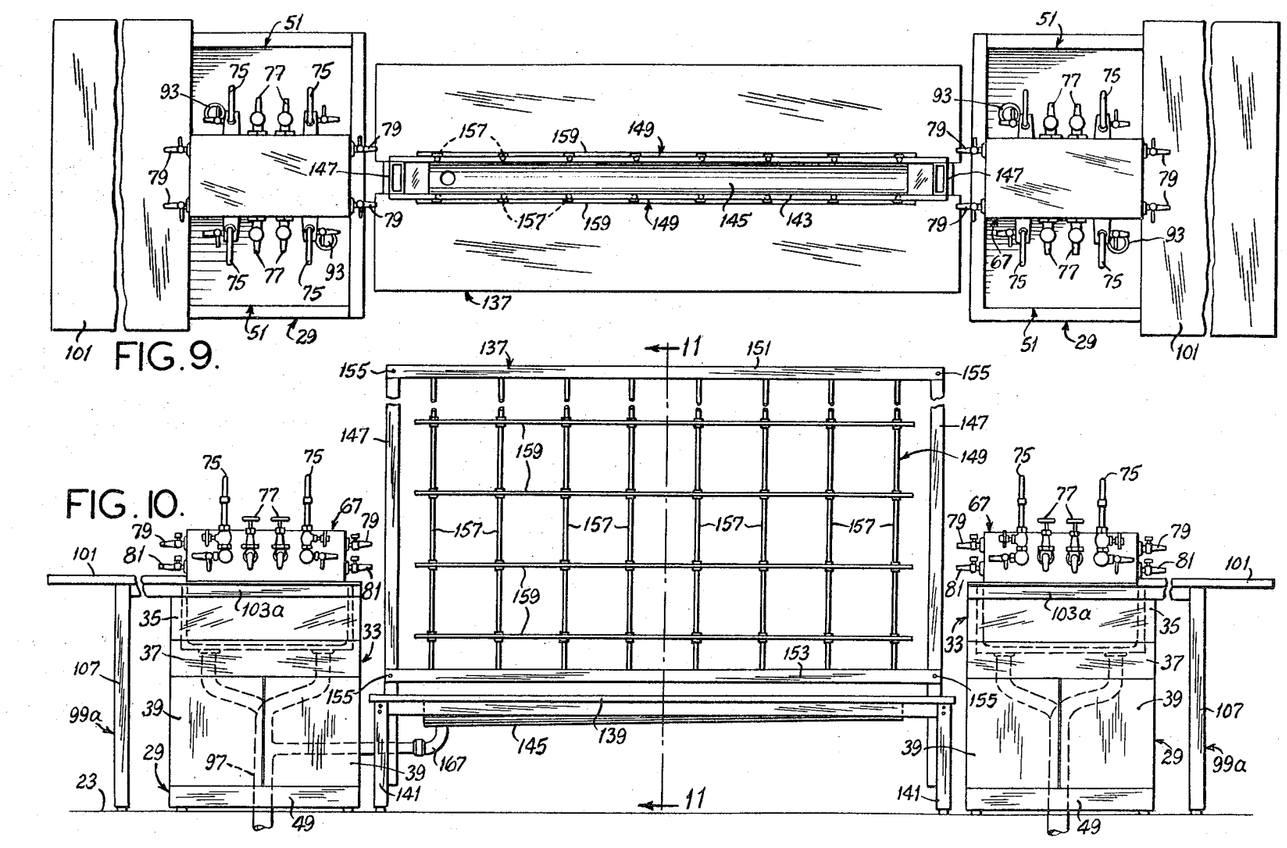
FIG. 9 is a greatly enlarged fragment of FIG. 1, showing an arrangement including a distillation or vacuum rack.
FIG. 10 is an elevation of FIG. 9.

In the room R6, shown as set up for an Organic Chemistry laboratory, the setup includes table tops 101 only on the outsides of the six cabinets, and so-called distillation or vacuum racks each designated 137 extending between each of the three pairs of cabinets. In this instance, table-top supporting frames 99a have side rails 103a which terminate at the inner side 33 of the cabinets. Referring to FIGS. 9–11, each rack 137 is shown to comprise an elongate relatively low table having a length somewhat less than the distance between the inner side walls 33 of the two cabinets of a pair. The top of the rack table is designated 139, and its legs are designated 141. The top 139 has a central longitudinal slot 143 extending from near one end thereof to near its other end. Immediately below this slot is a trough 145 which, as illustrated in FIG. 10, slopes down from right to left for drainage toward the left. This trough is secured in any suitable manner for the bottom of the table top 139. Extending upward from the top 139 between the ends of the slot and the ends of the top 139 are posts 147 which, as shown in FIG. 9, may be constituted by hollow rectangular aluminum extensions. These posts carry two vertical grids each generally designated 149, one toward one side of the slot and the other toward the other side of the slot. Each grid comprises upper and lower horizontal bars 151 and 153 having their ends secured at 155 to a respective edge of the posts. Extending vertically between the upper and lower bars of each grid are rods 157 of circular cross section. Vertical rods 157 carry horizontal rods 159. Each of the latter is supported in jaws 161 on a series of collars 163, each slidable on the vertical rods and each held in place by a set screw 165 (see FIG. 11A). By loosening these screws, the horizontal rods may be adjusted up or down to various desired elevations. As will be understood, rods 157 and 159 are adapted to have clamps applied thereto for holding distillation flasks, condensers etc. used in experimentation. A drain connection 167 extends from the low (left) end of the trough through a hole in the side of the adjacent cabinet and is connected to the respective drain pipe 97.

In the room R7, shown in FIG. 1 as set up for a Physical Chemistry laboratory, each of the arrangements shown for rooms R3, R5 and R6 is used.

Figure 12:
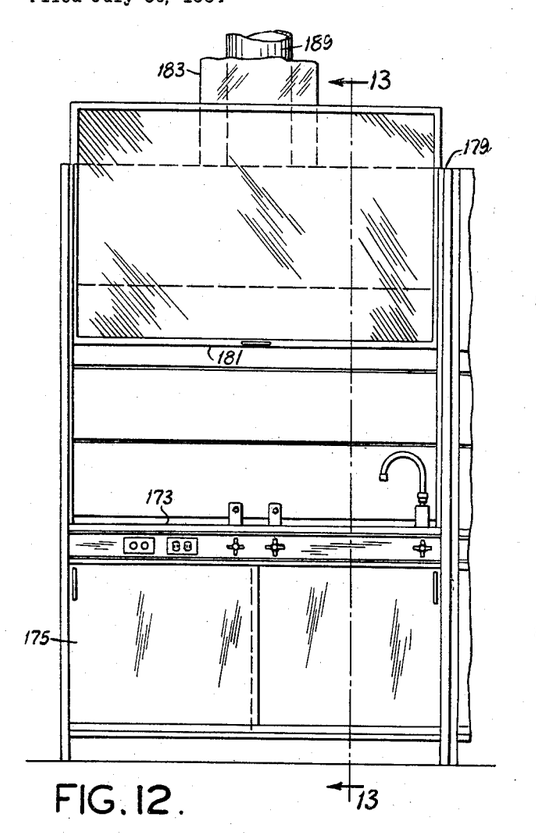
FIG. 12 is an elevation of a fume hood.
Figure 13:
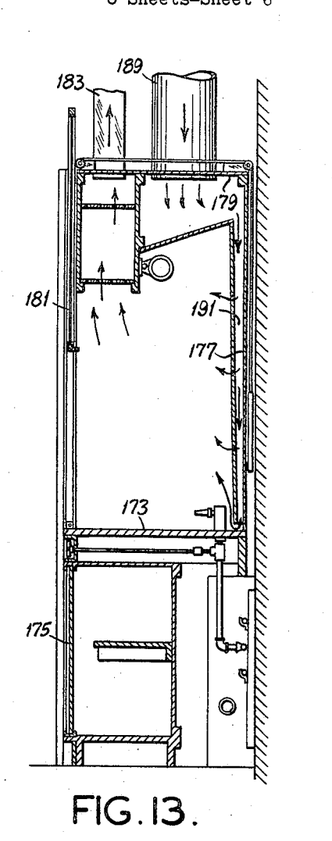
FIG. 13 is a vertical section taken on line 13—13 of FIG. 12.

Laboratory work in various scientific disciplines, such as Analytical Chemistry, Organic Chemistry, Physical Chemistry and Microbiology, involves the use of fume hoods. Referring to FIG. 1, five fume hoods 171 are shown in each of the Analytical and Organic Chemistry laboratory rooms R5 and R6, one fume hood 171 in each of the Physical Chemistry and Microbiology laboratory rooms R7 and R8. One of these fume hoods is shown in FIGS. 12 and 13. So far as this invention is concerned, it will suffice to say that the fume hood comprises a table top 173 over a cabinet 175, with a back hood panel 177 extending up from the back of the table top, a top hood panel 179, and a vertically slidable counterbalanced fume hood door 181. Experimentation involving emission of fumes is carried out on table 173 in the hood provided by panels 177 and 179 and the door. A vent for the hood is indicated at 183.

The fume hoods in adjacent rooms R5 and R6 are banked against the partition 15a common to these two rooms. The vent of each fume hood of the row of fume hoods in each of these rooms rises to an exhaust duct in the ceiling above such as indicated at 185 in FIG. 1 which carries off fumes to a vertical exhaust duct 187 in the utility tower 21 common to rooms R5 and R6. The fume hoods in adjacent rooms R7 and R8 are backed against the partition 15a common to these two rooms, and similarly vented via a ceiling duct 185 and a vertical exhaust duct 187 in the utility tower common to rooms R7 and R8. The utility towers, in addition to housing the exhaust ducts, may also serve for bringing various utilities into and out of the various rooms, including utilities such as previously mentioned and heating, ventilating and air conditioning system components. Use of these towers provides for vertical distribution of utilities and fume hood exhaust without interfering with open interior spaces. With each utility tower common to two rooms, considerable economy is effected in materials and installation costs re the utility and exhaust systems and servicing costs.

As shown in FIGS. 12 and 13, each fume hood may also have an air supply inlet 189 for delivery of air downward through a passage 191 between the back panel 177 and an apertured panel 193 for positive exhaust of fumes. The inlets 189 of the various hoods may have connections thereto from ceiling ducts similar to ducts 185 extending from vertical air ducts in towers 21 similar to ducts 187.

It will be understood that the room size and the arrangement of cabinets and tables therein is such as to allow for provision of cabinets, supplementary tables, sinks, etc., on each of the four walls of the room. In this regard, it is to be pointed out that each student will be provided with a portable equipment container which, when not in use, will be stored in a cabinet on one of the walls of his particular laboratory room. In the case of a chemistry discipline, for example, this container will contain flasks, test tubes, etc., and will be taken by the student from the cabinet to his particular station (such as indicated at A in FIG. 1A) for laboratory use. A drawer may be provided under the table top at each station for holding the equipment container of the student assigned to that station during his laboratory period. At the end of the period, the student returns his equipment container to the storage cabinet provided therefor.

As an example of the convertibility of a laboratory room from one scientific discipline to another, assume that it is desired to convert room R5 from an Analytical Chemistry laboratory to a General Physics laboratory. All that is necessary to accomplish this, so far as student workbench space is concerned, is to remove the utility boxes 67 from the sinks, remove the trim strips 115, substitute panels 131 for panels 137 and make the necessary utility connections, and push in the table tops 101. With the sinks out of use, the drain pipes 97 may be capped as illustrated in FIG. 8. The removed utility boxes 67 and trim strips 115 may be re-used elsewhere or re-used in room R5 at a later time.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A laboratory facility for use for different science disciplines comprising a laboratory room having two opposite walls constituting end walls and two opposite walls constituting side walls, the floor of said room having two rows of utility openings therein extending endwise of the room, with each opening in one row transversely aligned and paired with a respective opening of the other row, a plurality of cabinets on the floor, one over each of said openings, each cabinet being rectangular in plan, having ends parallel to the end walls of the room and sides parallel to the side walls of the room, and being interiorly open for passage of utility lines and per se open at the top, each cabinet being adapted to have two sinks mounted therein at its top with one sink toward one end of the cabinet and the other sink toward the other end of the cabinet, a table-top supporting frame associated with each cabinet, each frame comprising a pair of horizontal rails located on the outside of the ends of the cabinet adjacent the top of the cabinet and extending laterally outward on both sides of the cabinet, said rails being adapted to support two table tops, one at each side of the cabinet, at an elevation above the top of the cabinet, legs for the rails, and two table tops mounted on the rails, one at each side of the cabinet, said table tops being slidably mounted on the rails between an open position wherein their edges toward the cabinet are located substantially in register with the sides of the cabinet for opening up the top of the cabinet and a closed position wherein said edges are contiguous substantially in the vertical central endwise plane of the cabinet to close the top of the cabinet.

2. A laboratory facility as set forth in claim 1 wherein, as to certain of the cabinets, the two table tops associated therewith are in their open position, and two sinks are mounted in the cabinet at the top of the cabinet, with one sink toward one end and the other sink toward the other end of the cabinet, each sink being of rectangular form having a front wall toward the respective end of the cabinet, a back wall, and end walls on the inside of the sides of the cabinet, the back walls of the sinks being spaced for passage of utility lines therebetween, and a utility box common to the two sinks removably mounted on the back walls of the sinks.

3. A laboratory facility as set forth in claim 1 wherein, as to certain of the cabinets, the two table tops associated therewith are in their open position, and an insert is provided closing the top of the cabinet.

4. A convertible laboratory workbench comprising a cabinet rectangular in plan having joined ends and sides, said cabinet being adapted to be placed on the floor of a laboratory room over a utility opening therein, said cabinet being interiorly open for passage of utility lines and per se open at the top, each cabinet being adapted to have two sinks mounted thereon at its top with one sink toward one end of the cabinet and the other sink toward the other end of the cabinet, a table-top supporting frame associated with each cabinet, each frame comprising a pair of horizontal rails located on the outside of the ends of the cabinet adjacent the top of the cabinet and extending laterally outward on both sides of the cabinet, said rails being adapted to support two table tops, one at each side of the cabinet at an elevation above the top of the cabinet legs for the rails, and two table tops mounted on the rails, one at each side of the cabinet, said table tops being slidably mounted on the rails between an open position wherein their edges toward the cabinet are located substantially in register with the sides of the cabinet for opening up the top of the cabinet and a closed position wherein said edges are contiguous substantially in the vertical central endwise plane of the cabinet to close the top of the cabinet.

5. A convertible laboratory workbench comprising a cabinet rectangular in plan having joined ends and sides, said cabinet being interiorly open for passage of utility lines and per se open at the top, a pair of sinks removably mounted on the cabinet at the top thereof with one sink toward one end of the cabinet and the other sink toward the other end of the cabinet, each sink being of rectangular form having a front wall toward the respective end of the cabinet, a back wall, and end walls on the inside of the cabinet sides, the back walls of the sinks being spaced for passage of utility lines therebetween, a utility box common to the two sinks removably mounted on the back walls of the two sinks, said utility box carrying utility outlets for the workbench, and a table structure including two table tops extending outward from the tops of the sides of the cabinet, said table tops being mounted so as to be repositionable to close the top of the cabinet upon removal of the utility box.

6. A convertible laboratory workbench as set forth in claim 5 wherein said table structure includes a frame supporting said table tops, said frame comprising a pair of rails extending parallel to the ends of the cabinet on the outside thereof adjacent the top of the cabinet, and legs for the rails, the table tops being slidable inward on the rails to close the top of the cabinet upon removal of the utility box.

7. A convertible laboratory workbench as set forth in claim 5 wherein the cabinet has sink supports for the sinks extending along the inside of the sides of the cabinet below and adjacent the top, and, at each end thereof, a removable panel below the level of said supports, and doors below said panel for access to an enclosure in the cabinet below the respective sink.

References Cited

UNITED STATES PATENTS

| | | | |
|---|---|---|---|
| 1,582,573 | 4/1926 | Caldwell | 312—228 X |
| 1,951,238 | 3/1934 | Fiene | 312—228 |
| 2,037,482 | 4/1936 | Oliver | 52—236 |
| 2,334,776 | 11/1943 | King et al. | 98—115 X |
| 2,949,984 | 8/1960 | Daniels | 52—122 X |
| 3,099,232 | 7/1963 | Cooper | 108—83 |
| 3,111,077 | 11/1963 | Cortright | 98—115 |
| 3,162,863 | 12/1964 | Wokas | 4—252 X |
| 3,226,727 | 12/1964 | Frey | 52—236 X |

FOREIGN PATENTS 831,461 3/1960 Great Britain.

FRANK L. ABBOTT, *Primary Examiner.*

S. D. BURKE, M. WARNECKE, R. A. STENZEL,
*Assistant Examiners.*